United States Patent [19]
Horn et al.

[11] Patent Number: 4,560,708
[45] Date of Patent: Dec. 24, 1985

[54] POLYISOCYANURATE/POLYURETHANE ELASTOMERS BASED ON SUSPENSIONS OF CRYSTALLINE POLYESTERS AND POLYHYDROXYL COMPOUNDS

[75] Inventors: Peter Horn, Heidelberg; Anton Hesse, Weinheim; Walter Mann, Frankenthal; Wolfram Frank, Heidelberg; Matthias Marx, Bad Durkheim; Walter Heckmann, Weinheim, all of Fed. Rep. of Germany

[73] Assignee: BASF Aktiengesellschaft, Ludwigshafen, Fed. Rep. of Germany

[21] Appl. No.: 671,444

[22] Filed: Nov. 14, 1984

[51] Int. Cl.$^4$ .................. C08G 18/14; C08G 18/42
[52] U.S. Cl. .................... 521/137; 252/182; 525/450; 525/451; 525/454; 521/902
[58] Field of Search ............ 521/137, 902; 525/454, 525/450, 451; 252/182

[56] References Cited
U.S. PATENT DOCUMENTS

| | | | |
|---|---|---|---|
| 4,093,569 | 6/1978 | Reischl et al. | 521/137 |
| 4,165,432 | 8/1979 | Preston et al. | 521/137 |
| 4,211,849 | 7/1980 | Kollmeier et al. | 521/137 |
| 4,243,755 | 1/1981 | Marx et al. | 521/137 |
| 4,260,530 | 4/1981 | Reischl et al. | 521/137 |
| 4,452,920 | 6/1984 | Joubert | 521/137 |
| 4,452,922 | 6/1984 | Speranza et al. | 521/137 |

FOREIGN PATENT DOCUMENTS

| | | |
|---|---|---|
| 0017111 | 3/1980 | European Pat. Off. . |
| 0032380 | 1/1981 | European Pat. Off. . |
| 0062204 | 9/1982 | European Pat. Off. . |

Primary Examiner—Herbert S. Cockeram
Attorney, Agent, or Firm—William G. Conger; Joseph D. Michaels

[57] ABSTRACT

Crystallite suspensions containing from 3 to 70 weight percent of a crystalline, ethylenically unsaturated polyester prepared through condensation polymerization, and having a molecular weight factor per double bond of 154.4 to 408, as the dispersed phase, and from 30 to 97 weight percent of a polyhydroxyl compound having a functionality of from 2 to about 8, a hydroxyl number of from 20 to 800, and a melting point of less than 30° C. as the coherent phase are suitable for preparing non-cellular and cellular polyurethane- or polyurethane group-containing polyisocyanurate foams.

10 Claims, No Drawings

POLYISOCYANURATE/POLYURETHANE ELASTOMERS BASED ON SUSPENSIONS OF CRYSTALLINE POLYESTERS AND POLYHYDROXYL COMPOUNDS

BACKGROUND OF THE INVENTION

1. Field of the Invention

The present invention relates to crystallite dispersions. More particularly, the invention relates to crystallite dispersions of unsaturated polyesters in a coherent phase of conventional polyols, the process for their manufacture, and their use in polyurethane and polyurethane group-containing polyisocyanurate foams.

2. Description of the Prior Art

Cellular and non-cellular polyurethanes and polyisocyanurates have previously been prepared from dispersions of aromatic polyesters in polyhydroxyl compounds, which are liquid at room temperature. These dispersions may be prepared, for example, by dispersing the polyester melt under high shear gradients as disclosed in European published application No. 17,111. It is characteristic of this method of preparation that the dispersed phase is not bonded into the polymer structure when the polyurethane is prepared, but instead is present in the molded part as a filler which has a reinforcing effect. It is characteristic of this approach that the temperature of the polyurethane polymerization reaction must be chosen such that the melting point of the crystalline polyester is not reached.

Crystallite suspensions are also disclosed in European published application No. 32,380. These crystallite suspensions contain flexible polyols as the coherent phase, while the disperse phase is comprised of rigid, crystalline organic compounds having at least one Zerewitinoff active hydrogen atom. These crystallites possess melting points of from 30° to 260° C., and molecular weights of from 178 to approximately 100,000. This process has the advantage that the rigid, crystalline organic compound may be incorporated into the polyurethane structure in a carefully controlled manner by controlling its melting point or the transition from the dispersed to the coherent phase. As a result, added strength may be given to previously formed cell membranes. One disadvantage of this process is that the crystallite suspensions are very difficult to manufacture in a reproducible fashion.

An improvement in the reproducible preparation of storage-stable crystallite suspensions is described in European published application No. 62,204. When the reaction conditions such as agitator speed and temperature/time profile are carefully controlled, stable crystallite suspensions are obtained whose dispersed phase is comprised of up to 50 weight percent particles whose size ranges from 0.5 to 100 μm. However, random production variations sometimes produce crystallite suspensions in which more than 50 weight percent of the dispersed polyesters have a particle size smaller than 10 μm, so that thickening occurs when the crystallite suspensions are stored due to thixotropic effects. Such crystallite suspensions may no longer be processed into polymers by means of isocyanate addition polymerization. A further disadvantage is that crystallite suspensions prepared according to European published application No. 62,204 tend to form voids, which greatly reduce the quality of polyurethane group-containing polyisocyanurate foams prepared from these dispersions. Finally, these crystallite suspensions also all have the disadvantage that the polyurethane or polyurethane-group-containing polyisocyanurate foams prepared from them generate a relatively high smoke density when burned.

In order to prepare high-density polyurethane or polyurethane-group-containing polyisocyanurate molded parts or thick sandwich elements, the percentage of dispersed phase in the crystallite suspensions must be maximized, and the compressive strength of the molded parts obtained by using crystallite suspensions must be improved. The percentage of conventional reactive and nonreactive flame retardants in the polyurethane- or polyurethane-group-containing polyisocyanurate polymers must be reduced, and the smoke level significantly lowered when the material burns, in order to produce high quality, economical products.

SUMMARY OF THE INVENTION

These objectives were unexpectedly achieved with the aid of the crystallite suspensions of the subject invention. The object of the subject invention is a process which allows the facile preparation of crystallite suspensions which may be processed into fine-celled and abrasion-resistant polyurethane- and polyurethane-group-containing polyisocyanurate polymers. The crystallite suspensions of the subject invention in particular allow the formation of voids during the discontinuous preparation of slab foams to be reduced to a minimum.

Hence, the subject matter of the claimed invention relates to crystallite suspensions which contain (a) as the dispersed phase, from 3 to 70 weight percent of a crystalline, ethylenically unsaturated polyester prepared by the condensation polymerization of fumaric acid and ethylene glycol in a molar ratio of from 1:1.2 to 1:2 with a molecular weight factor per double bond of about 154 to 408; and (b) as the coherent phase, from 30 to 97 weight percent of a polyhydroxyl compound having a functionality of from 2 to about 8, a hydroxyl number of from 20 to about 800, and a melting point of less than 30° C., wherein up to 18 mole percent of the fumaric acid may be replaced by carboxylic acids selected from the group consisting of aliphatic, cycloaliphatic, and aromatic carboxylic acids and up to 20 mole percent of the ethylene glycol may be replaced by other alcohols, and wherein the weight percents are based on the total weight of the (a) and (b) components.

The subject of the invention is also a process for the preparation of crystallite suspensions wherein (a) from 3 to 70 weight percent of a crystalline, ethylenically unsaturated polyester prepared by the condensation polymerization of fumaric acid and ethylene glycol in a molar ratio of from 1:1.2 to 1:2 having a molecular weight factor per double bond of about 154 to 408, whereby up to 18 mole percent of the fumaric acid may be replaced by carboxylic acids selected from the group consisting of aliphatic, cycloaliphatic, and aromatic carboxylic acids and up to 20 mole percent of the ethylene glycol may be replaced by other alcohols, is dissolved in (b) from 30 to 97 weight percent of a polyhydroxyl compound having a functionality of from 2 to about 8, a hydroxyl number of from 20 to 800, and a melting point of less than 30° C. as the coherent phase at temperatures from 35° to 160° C. and the resulting solution is allowed to cool while being exposed to shear forces in order to form the crystallite suspension.

Finally, the subject of the invention relates to the use of the crystallite suspensions for the preparation of cellular or non-cellular polyurethane- or polyurethane-group-containing polyisocyanurate polymers.

DESCRIPTION OF THE PREFERRED EMBODIMENTS

The dispersed phase (a) in the crystallite suspensions claimed in the invention is comprised of crystalline, ethylenically unsaturated polyesters, having a molecular weight factor per double bond of from about 154 to 408, preferably from 160 to 250, prepared through the condensation polymerization of fumaric acid and ethylene glycol in a molar ratio of from 1:1.1 to 1:2, preferably from 1:1.25 to 1:1.8. Also suitable are crystalline, ethylenically unsaturated heteropolyesters in which up to 18 mole percent, preferably from 5 to 16 mole percent of the fumaric acid is replaced by aliphatic, cycloaliphatic, and/or aromatic carboxylic acids having from 4 to 36, preferably from 4 to 8 carbon atoms, and up to 20 mole percent, preferably from 5 to 16 mole percent of the ethylene glycol are replaced by alcohols having from 3 to 36 carbon atoms, preferably from 4 to 12 carbon atoms.

Preferably, the polyesters contain, in addition to fumaric acid, ethylenically unsaturated, optionally halogen-substituted dicarboxylic acids. Typical examples are aliphatic dicarboxylic acids such as maleic acid, chloromaleic acid, itaconic acid, succinic acid, glutaric acid, and adipic acid; cycloaliphatic dicarboxylic acids such as dihydro-, tetrahydro-, hexahydrophthalic acid, tetrachlorophthalic acid, 3,6-endomethylene-1,2,3,6-tetrahydrophthalic acid, and hexachloroendomethylenetetrahydrophthalic acid; and aromatic dicarboxylic acids such as o-phthalic acid, isophthalic acid, and terephthalic acid. However, mono-, di- and higher polybasic carboxylic acids, such as ethylhexanoic acid, fatty acids having from 10 to 20 carbon atoms, methacrylic acid, benzoic acid, 1,2,4,5-benzene tricarboxylic acid, and 1,2,4,5-benzene tetracarboxylic acid are suitable as modifiers. These carboxylic acids may be used individually and in the form of mixtures. Instead of the free carboxylic acids, the corresponding carboxylic acid derivatives, such as carboxylic acid alkyl esters having from 1 to 4 carbon atoms in the alkyl radical or, preferably, carboxylic acid anhydrides may be used. Maleic acid, adipic acid, and terephthalic acid are preferably used.

In a useful variation of the process of the subject invention, maleic acid or maleic acid derivatives, preferably maleic acid anhydride, may be used to prepare the crystalline, ethylenically unsaturated polyesters instead of fumaric acid or fumaric acid derivatives. However, the maleic acid and maleic acid derivatives must be isomerized into the trans-form in a yield exceeding 82 percent prior to or during the preparation of the polyester.

As previously described, the crystalline, ethylenically unsaturated polyesters may also be modified by partially replacing the ethylene glycol with other mono-, di-, or trifunctional alcohols. Particularly successful here and, therefore, preferred are aliphatic and cycloaliphatic diols having from 3 to 36 carbon atoms, which optionally may also be bonded together with ether groups as bridge elements. Typical examples are 1,3-propanediol, 2,2-dimethyl-1,3-propanediol, 1,4-butanediol, 1,4-butenediol, 1,3-butanediol, 1,6-hexanediol, diethylene glycol, dipropylene glycol, 1,2-cyclohexanediol and 1,5-cyclohexanediol, 2,2-bis(p-hydroxycyclohexyl)propane, and 4,4'-dihydroxydicyclohexylmethane. Also suitable are oxyethylated and/or oxypropylated 4,4'-dihydroxy-2,2-diphenylpropanes having molecular weights of from 316 to 492 as well as lesser amounts of mono-, tri-, or polyvalent alcohols such as 2-ethylhexanol, fatty alcohols having from 10 to 20 carbon atoms, benzyl alcohol, 1,2-di(allyloxy)-3-propanol, glycerine, and trimethylolpropane. Preferably used are n-hexanol and 2-ethylhexanol.

The crystalline, ethylenically unsaturated polyesters usable in accordance with the invention are generally prepared by means of melt condensation or condensation polymerization under azeotropic conditions, preferably in the presence of esterification catalysts in an inert gas atmosphere at temperatures from 150° to 220° C. using continuous or discontinuous processes. In order to prevent premature, undesired gelation of the unsaturated polyesters, inhibitors may be incorporated in the condensation polymerization mixture. For example, phenolic inhibitors such as hydroquinone or its alkyl-substituted derivatives have proven successful.

The crystalline, ethylenically unsaturated polyesters generally have an acid number of less than 30, preferably less than 20, and most preferably less than 5, and a hydroxyl number of from 90 to 600, preferably from 120 to 250. The average molecular weight ranges from approximately 210 to 3000, preferably from 500 to 2000, and the molecular weight factor per double bond ranges from 154.5 to 408, preferably from 160 to 250, and more preferably from 162 to 200.

The molecular weight factor per ethylenically unsaturated double bond is defined empirically as the net polymer weight per double bond calculated as the sum of the weights of the starting components per double bond, minus the condensation product given off during the condensation polymerization. This calculation also applies when carboxylic acid anhydrides are used instead of carboxylic acids. For an unsaturated polyester of fumaric acid, adipic acid, and ethylene glycol in a molar ratio of 1.0:0.1:1.5, the molecular weight ratio per double bond is then calculated as follows: 1 mole fumaric acid (molecular weight 116) has a weight of 116 g, 0.1 mole adipic acid (molecular weight 146) has a molecular weight of 14.6 g, and 1.5 mole ethylene glycol (molecular weight 62) has a weight of 93.0 g. The sum of these weights is, therefore, 223.6 g. If the weight of 2.2 moles water is subtracted (molecular weight 18) equal to 39.6 g, the molecular weight factor per double bond is 184.0 g.

Liquid polyhydroxyl compounds (b) having a functionality of from 2 to about 8 and a hydroxyl number of from 20 to 800 are suitable as the coherent phase for the crystallite suspensions claimed in the invention for conventional polyurethane processing temperatures, for example, from 10° to 30° C., generally about 45° C. However, mixtures of such polyhydroxyl compounds (b) and soluble crystalline components may also be used as the coherent phase provided that the mixture is homogeneous and is liquid in the cited temperature range.

Typical polyhydroxyl compounds (b) are: polyester polyols having functionalities from 2 to 6, preferably from 2 to 4, hydroxyl numbers from 20 to 700, preferably from 280 to 490, and acid numbers less than 30, preferably less than 5, based on organic dicarboxylic acids, preferably aliphatic dicarboxylic acids having from 2 to 12, preferably from 4 to 8 carbon atoms in the alkylene radical; and polyvalent alcohols, preferably diols having from 2 to 10, preferably from 2 to 6 carbon atoms. Typical examples of aliphatic dicarboxylic acids are succinic acid, glutaric acid, pimelic acid, undecandioic acid, dodecandioic acid, fumaric acid, maleic acid, chloromaleic acid, itaconic acid, and preferably adipic acid. Examples of aromatic dicarboxylic acids are phthalic acid and terephthalic acid. Examples of polyvalent and, in particular, bivalent alcohols are: 1,2- and 1,3-propylene glycol, dipropylene glycol, 1,5-pentamethylene glycol, 1,8-octamethylene glycol, 1,10-decamethylene glycol, glycerine, trimethylolpropane, pentaerythritol, sugar alcohols, for example sorbitol and, preferably, ethylene glycol, diethylene glycol, 1,4-butylene glycol, and 1,6-hexamethylene glycol. In addition, alkanolamines, dialkanolamines, and trialkanolamines may be used as the polyvalent alcohols, for example ethanolamine, diethanolamine, triethanolamine, and triisopropanolamine. The dicarboxylic acids and polyvalent alcohols may also be used in the form of mixtures. The following have proven to be particularly successful and are, therefore, preferably used: polyester polyols of adipic acid or mixtures of succinic, glutaric, and adipic acid, and diethylene glycol and alcohol mixtures of 1,4-butylene glycol, 1,5-pentamethylene glycol, and 1,6-hexamethylene glycol; ethylene glycol and 1,4-butylene glycol; ethylene glycol and diethylene glycol; ethylene glycol and trimethylolpropane; diethylene glycol and trimethylolpropane; ethylene glycol and pentaerythritol; ethylene glycol and triisopropanolamine; and diethylene glycol and triisopropanolamine. The polyester polyols have molecular weight from 220 to 3000 and preferably from 300 to 800.

Instead of the cited polyester polyols, which may be used individually or as mixtures, homogeneous mixtures of the above-cited polyester polyols and soluble crystalline organic components such as hydroxyl-group-containing polyesters of aromatic dicarboxylic acids and, preferably, unsubstituted linear diols, said mixtures being liquid at from 10° to 30° C., may also be used.

However, polyether polyols having functionalities from 2 to 8, preferably from 2 to 4, and hydroxyl numbers from 20 to 800, preferably from 25 to 700, prepared by conventional methods, for example by means of the anionic polymerization catalyzed by alkali hydroxides such as sodium or potassium hydroxide or by alkali alcoholates such as sodium methyoxide, potassium or sodium ethoxide, or potassium isopropoxide, or by means of cationic polymerization using Lewis acids such as antimony pentachloride, boron trifluoride etherate, etc., as catalysts of one or more cyclic ethers having from 2 to 4 carbon atoms in the alkylene radical, and an initiator molecule containing from 2 to about 8, preferably 2 to 4 active hydrogen atoms are preferably used as the polyhydroxyl compounds (b) for the coherent phase.

Suitable cyclic ethers are, for example, oxetane, tetrahydrofuran, and alkylene oxides such as 1,2- or 2,3-butylene oxide, styrene oxide, epichlorohydrin, and preferably ethylene oxide and 1,2-propylene oxide. The alkylene oxides may be used individually, alternatingly one after another, or as mixtures. Typical initiator molecules are: water, organic dicarboxylic acids such as succinic acid, adipic acid, phthalic acid or terephthalic acid; aliphatic and aromatic, optionally N-mono-, N,N- and N,N'-dialkyl-substituted diamines having from 1 to 4 carbon atoms in the alkyl radical; unsubstituted or optionally mono- and dialkyl-substituted ethylenediamines, diethylenetriamines, triethylenetetramines, 1,3-propylenediamines, 1,3- or 1,4-butylenediamines, 1,2-, 1,3-, 1,4-, 1,5-, and 1,6-hexamethylenediamines, phenylenediamines, 2,4- and 2,6-toluenediamines, and 4,4'-, 2,4'-, and 2,2'-diaminodiphenylmethanes. Particularly interesting polyether polyols prepared from compounds of the group cited above are N,N,N',N'-tetrakis(2-hydroxyethyl)ethylenediamine, N,N,N',N'-tetrakis(2-hydroxypropyl)ethylenediamine, N,N,N'N",N"-pentakis(2-hydroxypropyl)diethylenetriamine, phenyldiisopropanolamine, and higher molecular weight alkylene oxide adducts of aniline.

Typical initiator molecules are also alkanolamines such as ethanolamine, diethanolamine, N-methyl, and N-ethyl ethanolamine, N-methyl- and N-ethyldiethanolamine, and triethanolamine, ammonia, hydrazine, and hydrazides. Preferably used are polyvalent, particularly di- or trivalent alcohols such as ethylene glycol, 1,2-propylene glycol, and 1,3-propylene glycol, diethylene glycol, dipropylene glycol, 1,4-butylene glycol, 1,6-hexamethylene glycol, glycerine, trimethylolpropane, pentaerythritol, sorbitol, and sucrose.

The polyether polyols have molecular weights from 200 to 7000, preferably from 500 to 6500. Like the polyester polyols, they may also be used individually or in the form of mixtures. Mixtures of polyester polyols and polyether polyols may also be used as the coherent phase, for example, hydroxyl-group-containing polyester amides and polyacetals and their mixtures, provided that they meet the requirements set forth above.

The crystallite suspensions claimed in the invention contain, as the dispersed phase, from 3 to 70 weight percent, preferably from 10 to 50 weight percent, and most preferably from 15 to 40 weight percent based on the total weight of components (a) and (b), of at least one crystalline, ethylenically unsaturated polyester (a) and from 30 to 97 weight percent, preferably from 50 to 90 weight percent, and most preferably from 60 to 85 weight percent, based on the total weight of components (a) and (b) of at least one polyhydroxyl compound (b) as the coherent phase.

To prepare the crystallite suspensions, the crystalline, ethylenically unsaturated polyesters (a) and the polyhydroxyl compounds (b) are mixed and heated until a clear solution forms. Generally temperatures from 35° to 165° C., preferably from 80° to 150° C., are adequate to accomplish the dissolution. The clear solution is then allowed to cool while mixing and subjecting the solution to high shear forces in order to form the crystallite suspension. The suspension is then allowed to cool to 25° C. generally over a period of from 4 to 20 hours, preferably from 6 to 18 hours.

The crystallite suspensions claimed in the invention may be processed directly into polyurethane- or polyurethane-group-containing polyisocyanurate polymers. However, they may also be modified by adding amines, dialkylenetriamines, and/or alkanolamines, halogenated hydrocarbons, ethylenically unsaturated monomeric compounds, and/or free-radical forming agents suitable for particular applications.

Suitable modifying agents are amines, dialkylenetriamines and/or alkanolamines which are able to enter into an addition reaction analogous to the Michael reaction with the ethylenically unsaturated double bond of the crystalline polyesters (a). The following have proven to be particularly efficacious for this purpose and are, therefore, preferably used: aliphatic, cycloaliphatic, and araliphatic amines, in particular primary and secondary mono- and diamines, dialkylenetriamines, alkanolamines, preferably those having formula:

$$H_2N-(CR^1R^2)_n-NR^3-(CR^1R^2)_m-X,$$

where:
$R^1$, $R^2$, $R^3$ are identical or different linear or branched alkyl radicals having from 1 to 4 carbon atoms in the alkyl radical, for example ethyl, n-propyl, isopropyl, n-butyl, sec-butyl, tert-butyl and preferably methyl radicals, or hydrogen,
X is an $NH_2$— or OH-group,
n is a whole number from 2 to 12, preferably from 2 to 4, and
m is a whole number from 2 to about 3.

Typical examples are primary or secondary aliphatic or cycloaliphatic monoamines having from 2 to 20, preferably from 4 to 8 carbon atoms such as n- and isopropylamine, n- and sec-butylamine, n-pentylamine, n-hexylamine, n-octylamine, 2-ethyl-1-hexylamine, 2-ethyl-1-octylamine, decylamine, dodecylamine, cyclohexylamine, diisopropylamine, dibutylamine, ethylbutylamine, and N-methylcyclohexylamine; primary or secondary aliphatic or cycloaliphatic diamines having from 2 to 20, preferably from 2 to 12 carbon atoms, for example, ethylenediamine, 1,4-butylenediamine, N,N'-dimethyl-1,4-butylenediamine, N-methyl-1,4-butylenediamine, 1,6-hexamethylenediamine, N-ethyl-1,6-hexamethylenediamine, piperazine, 2,4- and 2,6-hexahydrotoluenediamine, 2,4'-, 2,2'-, and 4,4'-diaminodicyclohexylmethane; alkanolamines, for example, ethanolamine, diethanolamine, propanolamine, and dipropanolamine; aminoalkylalkanolamines, for example, aminoethyl-, aminobutyl-, and aminohexylhexanolamines, aminopropyl- and aminobutylbutanolamines, aminoisobutylethanolamine, and, preferably, aminoethylethanolamine and aminoethylisopropanolamine; and dialkylenetriamines, for example, ethylene butylenetriamine, ethylene hexamethylenetriamine, dihexamethylenetriamine, ethylene ether ethylenetriamine, propylene ether ethylenetriamine, and, preferably, diethylenetriamine, di-1,3- or di-1,2-propylenetriamine, and dibutylenetriamines. The amines, alkanolamines, and dialkylenetriamines may be used individually or in the form of mixtures. Preferably, the following are used: ethanolamine, cyclohexylamine, and 2-methyl-5-aminobenzylamine.

In order to prepare the modified crystallite suspension with the addition products obtained in a manner analogous to the Michael reaction, from 0.1 to 7 parts by weight per 100 parts by weight crystallite suspensions of components (a) and (b), preferably from 0.5 to 5 parts by weight, and more preferably from 1.5 to 3 parts by weight amine, alkanolamine, and/or dialkylenetriamine are added to the crystallite suspension and the mixtures are then heated at temperatures from 20° to 80° C., preferably from 30° to 60° C., optionally while stirring. Since the addition of the primary or secondary amino groups to the ethylenically unsaturated double bond in the polyesters (a) proceeds very rapidly, reaction times of from 0.2 to 4 hours, preferably from 0.5 to 2 hours are adequate under these conditions. It is desirable to select the proportions of the reacting components in such a way that essentially no cross-linking reaction takes place between the crystalline polyesters (a).

By using crystallite suspensions modified with amines, alkanolamines, or dialkylenetriamines, polyurethane-group-containing polyisocyanurate foam slabs may be produced up to 4 $m^3$ in size whose basal surfaces contain few or no voids.

In order to improve flame resistance and to reduce the smoke density when three-dimensional polyurethane or polyurethane-group-containing polyisocyanurate objects produced from the crystallite suspensions described in the invention are burned, the crystallite suspensions claimed in the invention may be modified with aliphatic, cycloalphatic, or aromatic chlorinated and brominated hydrocarbons. The effectiveness of the cited additives may be increased by adding free-radical-forming agents as synergists. Typical examples of chlorinated and brominated hydrocarbons, which may be used in amounts ranging from 1 to 50 parts by weight, preferably from 5 to 30 parts by weight, per 100 parts by weight crystallite suspension of components (a) and (b) include chlorinated paraffins having a chlorine content from 20 to 75 weight percent, preferably from 40 to 70 weight percent, hexabromocyclododecane, or octabromobiphenyl.

The following free-radical-forming agents and synergists may be used: azo compounds such as azodiisobutyronitrile and azodicarboxylic acid esters and peroxides, for example tert-butylperbenzoate, benzoyl peroxide, dicumyl peroxide, and cyclohexanone peroxide. Also suitable as free-radical-forming agents are initiators having unstable carbon-carbon bonds such as light-sensitive initiators which break down into radicals under the influence of sunlight or ultraviolet light whose wavelengths range from 300 to 450 nm, for example, benzylketals, benzoin ethers, acylphosphine compounds, and naphthalenesulfonyl chloride. Additional free-radical-forming agents may be incorporated into the crystallite suspensions claimed in the invention, in amounts of from 0.5 to 5 parts by weight, preferably from 0.1 to 2 parts by weight per 100 parts by weight crystallite suspension of components (a) and (b).

The crystallite suspensions claimed in the invention may be further improved, for example to increase compressive load, by adding one or more ethylenically unsaturated monomeric compounds, which may be copolymerized with the ethylenically unsaturated double bond of polyester (a), in amounts of from 1 to 50 parts by weight, preferably from 3 to 25 parts by weight per 100 parts by weight of the crystallite suspension of components (a) and (b). For example, allyl and, preferably, vinyl compounds have proven themselves to be suitable for this purpose. Typical examples are: styrene, substituted styrenes, for example, p-chlorostyrene or vinyl toluene, esters of acrylic acid or methacrylic acid containing alcohols having from 1 to 18 carbon atoms, for example methylmethacrylate, butylacrylate, ethylhexylacrylate, hydroxypropylacrylate, dihydrodicyclopentadienylacrylate, butanediol diacrylate, and methacrylic acid amides; allylesters such as diallylphthalate, and vinyl esters such as ethylhexanoic vinylate, vinyl pivalate, and others. In addition, mixtures of the olefinically unsaturated monomers cited above may also be used. Preferably used as the monomeric compounds are: styrene, α-methylstyrene, chlorostyrene, vinyltoluene, divinylbenzene, diallylphthalate, and triallylisocyanurate.

The ethylenically unsaturated monomeric compounds may be advantageously used with polymerization catalysts such as the above-cited free-radical-forming agents. In the process, cobalt naphthenate or octoate may be used as suitable accelerators.

The crystallite suspensions claimed in the invention are preferably used to prepare non-cellular or, in particular, cellular polyurethane- or polyurethane-group-containing polyisocyanurate polymers. To do this, the crystallite suspensions may be reacted directly with organic polyisocyanates. The stable crystallite suspensions, however, may optionally be diluted prior to processing using the polyhydroxyl compounds previously cited. This allows adjustment to the optimum polyester (a) content.

The polyisocyanates which are used for this purpose are aliphatic, cycloaliphatic, arylaliphatic, and, preferably, aromatic polyvalent isocyanates. Typical examples are: alkylene diisocyanates having from 4 to 12 carbon atoms in the alkylene radical, such as 1,12-dodecamethylene diisocyanate, 1,4-tetramethylenediisocyanate, and preferably 1,6-hexamethylenediisocyanate; cycloaliphaticdiisocyanates such as 1,3- and 1,4-cyclohexanediisocyanate as well as various mixtures of these isomers, 1-isocyanato-3,3,5-trimethyl-5-isocyanatomethylcyclohexane (isophorone diisocyanate), 2,4- and 2,6-hexahydrotoluenediisocyanate as well as corresponding isomer mixtures, 4,4'-, 2,2'-, and 2,4'-dicyclohexylmethanediisocyanate as well as corresponding isomer mixtures, and preferably aromatic di- and polyisocyanates such as 4,4'-, 2,4'-, and 2,2'-diisocyanatodiphenylmethane and corresponding isomer mixtures, 2,4- and 2,6-diisocyanatotoluene and corresponding isomer mixtures, 1,5-diisocyanatonaphthalene, polyphenylene polymethylene polyisocyanates, 2,4,6-triisocyanatotoluene, and, preferably, mixtures of diphenylmethanediisocyanates and polyphenylene polymethylene polyisocyanates (polymeric MDI). The di- and polyisocyanates may be used individually or in the form of mixtures.

Frequently so-called modified polyvalent isocyanates products obtained through the chemical reaction of the above di- or polyisocyanates, are used. For example, the following may be used as the modified organic di- or polyisocyanate: carbodiimide-group-containing polyisocyanates in accordance with German Patent Document No. 10 92 007; allophanate-group-containing polyisocyanates, for example those described in British Pat. No. 994,890, the references disclosed in Belgium Patent Document No. 761,626 and in Dutch published application No. 71 02 524; isocyanurate-group-containing polyisocyanates, for example those described in German Patent Documents Nos. 10 22 789, 12 22 067, and 10 27 394 as well as in German published applications Nos. 19 29 034 and 20 04 048; urethane-group-containing polyisocyanates such as those described in the references cited in Belgium Patent Document No. 752,261 or U.S. Pat. No. 3,394,164; acylated urea-group-containing polyisocyanates such as those described in German Patent Document No. 12 30 778, biuret-group-containing polyisocyanates such as those described in German Patent Document No. 11 01 394 and British Pat. No. 889,050; polyisocyanates prepared by means of telomerization reactions such as those corresponding to the references in Belgium Patent Document No. 723,640; ester-group-containing polyisocyanates such as those described in British Pat. Nos. 965,474 and 1,072,956, U.S. Pat. No. 3,567,765, and German Patent Document No. 12 31 688.

However, the following are preferably used: urethane-group-containing polyisocyanates such as low-molecular weight-diol, -triol, or polyoxypropyleneglycol-modified 4,4'-diphenylmethanediisocyanate, toluenediisocyanate, or mixtures of diphenylmethanediisocyanates and polyphenylene polymethylene polyisocyanates, carbodiimide-group and/or isocyanurate-group-containing polyisocyanates, for example those based on diphenylmethanediisocyanate and/or toluenediisocyanate and, preferably, toluenediisocyanates, diphenylmethanediisocyanates, mixtures of diphenylmethanediisocyanates and polyphenylene polymethylene polyisocyanates (polymeric MDI) and mixtures of toluenediisocyanates and polymeric MDI.

Among the blowing agents which may be used to prepare cellular polyurethane elastomers, polyurethane- or polyurethane-group-containing polyisocyanurate foams are reactive blowing agents such as water, which reacts with isocyanate groups to form carbon dioxide. The amounts of water which are used preferably range from 0.1 to 3 weight percent based on the weight of the polyisocyanate, respectively from 0.1 to 2 weight percent based on the total weight of the polyisocyanate and crystallite suspension. Larger amounts of water may be used optionally.

Other blowing agents which may be used are essentially non-reactive low-boiling point liquids which evaporate as a result of the exothermic heat produced in the polymerization reaction. Suitable liquids are those which are inert relative to the organic polyisocyanate and which have boiling points under 100° C. Examples of such preferably used liquids are halogenated hydrocarbons such as methylene chloride, trichlorofluoromethane, dichlorodifluoromethane, dichloromonofluoromethane, dichlorotetrafluoromethane, and 1,1,2-trichloro-1,2,2-trifluoroethane. Mixtures of these low-boiling-point liquids and mixtures with other, substituted or unsubstituted hydrocarbons, may also be used.

The most desirable amount of low-boiling-point liquid to be used as a blowing agent in preparing the foams depends on the foam density which is being sought, as well as on whether reactive blowing agents such as water are also being used. In general, amounts from 5 to 40 parts by weight based on 100 parts by weight organic polyisocyanate, or from 2 to 30 parts by weight based on the total weight of the polyisocyanate and crystallite suspension, produce satisfactory results. In order to prepare integral-skin foams, only inert, low-boiling-point liquids are used.

Suitable catalysts to accelerate the formation of polyurethane between the crystallite suspension, optionally water, if present, and the polyisocyanates are, for example, tertiary amines such as dimethylbenzylamine, N,N,N',N'-tetramethyldiaminoethylether, bis(dimethylaminopropyl)urea, N-methyl or N-ethylmorpholine, dimethylpiperazine, 1,2-dimethylimidazole, 1-azabicyclo[3.3.0]octane, and, preferably, triethylenediamine, metal salts such as tin dioctoate, lead octoate, tin diethylhexoate, and, preferably, tin(II)-salts and dibutyl tin dilaurate as well as, more preferably, mixtures of tertiary amines and tin organic salts. Preferably from 0.1 to 5.0 weight percent tertiary-amine-based catalyst and-/or from 0.1 to 1.0 weight percent metal salts are used, based on the weight of the crystallite suspension.

Conventional trimerization and polymerization catalysts for polyisocyanates have proven to be successful in preparing isocyanurate-group-containing foams. Typical examples are: strong bases such as quarternary ammonium hydroxides, for example benzyltrimethylammonium hydroxide; alkali metal hydroxides, for example sodium or potassium hydroxide, alkali metal alkoxides, for example sodium methoxide and potassium isopropoxide, trialkylphosphines, for example triethylphosphine; alkylaminoalkylphenols, for example 2,4,6-tris(dimethylaminomethyl)phenol; 3- and 4-substituted pyridines, for example 3- and 4-methylpyridine; organometallic salts, for example tetrakis(hydroxyethyl)-sodium borate; Friedel-Crafts catalysts, for example Lewis acids such as aluminum chloride, iron(III) chloride, boron trifluoride and zinc chloride, and alkali metal salts of weak organic acids and nitrophenolates, for example potassium octoate, potassium 2-ethylhexoate, potassium benzoate, sodium picrate, and potassium phthalimide. Preferably used are strongly basic N,N',N''-tris(dialkylaminoalkyl)-s-hexahydrotriazines, for example N,N',N''-tris(dimethylaminopropyl)-s-hexahydrotriazine, optionally in combination with aliphatic low-molecular-weight mono- and dicarboxylic acids, for example acetic acid and adipic acid, or aromatic carboxylic acid such as benzoic acid.

The desirable amount of isocyanurate-group-forming catalyst depends on the effectiveness of the specific catalyst. Generally, it has been found to be desirable to use from 1 to 15 parts by weight, preferably from 3.5 to 10 parts by weight, catalyst for each 100 parts by weight organic polyisocyanate.

In order to prepare urethane-group-containing polyisocyanurate foams, the catalysts which assist in the formation of the urethane and isocyanate groups may be mixed together.

Auxiliaries and additives may also be incorporated in the optionally expandable reaction mixture of polyisocyanate, crystallite suspension, catalyst, and blowing agent. Typical examples are chain extenders, organic and inorganic fillers, surfactant foam stabilizers, hydrolysis inhibitors, cell-size regulators, fungistats and bacteriostats, colorants, pigments, and flame retardants.

The non-cellular and cellular polyurethanes or polyurethane-group-containing polyisocyanurates may be prepared without the addition of chain extenders or cross-linking agents. However, in many cases it may be desirable to use chain extenders or cross-linking agents, for processing. Suitable chain extenders or cross-linking agents have molecular weights ranging from 30 to 600, preferably from 60 to 300, and they preferably possess two active hydrogen atoms. Typical examples are aliphatic and aromatic diols having from 2 to 14, preferably from 2 to 6 carbon atoms, such as 1,2- or 1,3-propanediol, 1,5-pentanediol, 1,6-hexanediol, and preferably ethanediol, 1,4-butanediol, and bis(2-hydroxyethyl)hydroquinone; diamines such as ethylenediamine and, optionally, 3,3'-disubstituted or 3,3',5,5'-tetra-substituted 4,4'-diaminodiphenylmethanes; ethanolamines such as triethanolamine; and polyvalent alcohols such as glycerine, trimethylolpropane, and low-molecular weight polyoxyalkylene polyols of these basic components. In addition, heterocyclic compounds such as tris(hydroxyalkyl)isocyanurates, preferably tris($\beta$-hydroxyethyl)isocyanurate and their oxyalkylated products, preferably oxyethoxylated and oxypropylated products, may also be used.

Typical auxiliaries are surfactants used to support the homogenization of the starting products, expecially those which may also be suitable for controlling the cell structure of the foams. Typical examples are siloxane-oxyalkylene heteropolymers and other organopolysiloxanes; oxyethylated alkylphenols; oxyethylated fatty alcohols; paraffin oils; castor oil or castor oil acid esters; and Turkey red oil. These auxiliaries may be used in amounts of from 0.1 to 5 parts by weight per 100 parts by weight of the polyisocyanate and crystallite suspension mixture.

Suitable flame retardants are tricresylphosphate, tris-2-chloroethylphosphate, tris-chloropropylphosphate, and tris-2,3-dibromopropylphosphate; brominated and chlorinated polyethers; and reaction products of brominated and chlorinated aromatic dicarboxylic acid anhydrides with di- and higher functionality alcohols such as ethylene glycol, diethylene glycol, and glycerine.

In addition to the already cited halogen-substituted organic flame retardants, inorganic flame retardants may also be used, for example antimony trioxide, arsenic oxide, ammonium phosphate, ammonium sulfate, alkali metal salts of hypophosporous acid, hydrated aluminum oxides, elemental phosphorus. Additional flame retardants such as urea, isocyanuric acid derivatives such as melamine, dicyandiamide, and guanidine salts such as guanidine carbonate may be used to make the foams flame-resistant. In general, it has been found to be advantageous to use from 5 to 50 parts by weight, preferably from 5 to 25 parts by weight of the cited flame retardants per 100 parts by weight of the mixture of organic polyisocyanate and crystallite suspension.

Further information on other conventional additives cited above may be found in the literature, for example the monograph by J. H. Saunders and K. C. Frisch, *High Polymers*, volume XVI, *Polyurethanes*, pts. 1 and 2, Interscience Publishers, 1962 and 1964.

In order to prepare polyurethane foams, the organic polyisocyanates and crystallite suspensions or mixtures of crystallite suspensions and additional polyester or polyether polyols are reacted in such amounts that the ratio of reactive hydrogen atoms to isocyanate groups ranges from 1:0.8 to 1:2.5, preferably from 1:0.9 to 1:1.2, and, more preferably, 1:1, wherein the percentage of polyester (a) present as a dispersed phase in the expandable reaction mixture is from 0.5 to 30 weight percent, preferably from 1 to 26 weight percent, based on the total weight of polyhydroxyl compounds and optional chain extenders or cross-linking agents.

In order to prepare urethane-group-containing polyisocyanurate foams, equivalent ratios of the isocyanate groups in the polyisocyanates to the reactive hydrogen atoms in the crystallite suspension ranging from 2:1 to 60:1, preferably from 2:1 to 10:1, have been found to be desirable. The percentage of polyester (a) present as the dispersed phase in the expandable reaction mixture is generally from 0.5 to 30 weight percent here, preferably from 1 to 26 weight percent, based on the total weight of polyhydroxyl compounds and optional chain extenders or cross-linking agents.

The urethane and urethane and isocyanurate-group-containing foams are preferably prepared using a one-shot process. To do this, the polyisocyanates are mixed with the crystallite suspension, catalysts, blowing agents and optional auxiliaries and additives in an intensive manner in the desired ratios at temperatures from 0° to 50° C., preferably from 15° to 40° C., and the reaction mixture is allowed to expand in open or closed molds. The urethane-group-containing polyurethane foams prepared in accordance with the invention possess densities of from 10 to 300 g/l when allowed to expand freely, preferably from 60 to 130 g/l. The urethane-group-containing polyisocyanurate foams have densities from 5 to 100 g/l, preferably from 10 to 50 g/l. These foams are advantageously used as insulating materials in cooling equipment, for coating pipes, and in construction applications. In the examples which follow, the parts cited are parts by weight.

I Preparation of crystalline, ethylenically unsaturated polyesters

EXAMPLE 1

An ethylenically unsaturated polyester was prepared from fumaric acid and ethylene glycol in a molecular ratio of 1:1.35 in the presence of 200 ppm hydroquinone by means of melt condensation. After three days' storage at 40° C., it crystallized out to a colorless mass.

The product had an acid number of 2.6, a hydroxyl number of 167 (based on the $BF_3$ method), and a melt viscosity at 150° C. of 100 m.Pa.s. The calculated molecular weight factor per double bond was 163.7.

EXAMPLE 2

By a process similar to Example 1, an unsaturated polyester was synthesized in a condensation reaction from fumaric acid, succinic acid, and ethylene glycol in a molar ratio of 0.85:0.15:1.35. After storing three days at 40° C., it crystallized out into a colorless mass.

The unsaturated polyester had an acid number of 2.6, a hydroxyl number of 167 (based on the $BF_3$ method), and a melt viscosity at 150° C. of 100 m.Pa.s. The calculated molecular weight factor per double bond was 192.9.

COMPARISON EXAMPLE A

An ethylenically unsaturated polyester was prepared by means of melt condensation from fumaric acid and 1,4-butanediol in a molecular ratio 1:1.35 in the presence of 100 ppm hydroquinone. This polyester crystallized out into a colorless mass within 24 hours at room temperature.

The unsaturated polyester had an acid number of 5.5, a hydroxyl number of 123 (based on the $BF_3$ method) and a melt viscosity at 150° C. of 210 m.Pa.s. The calculated molecular weight factor per double bond was 201.5.

COMPARISON EXAMPLE B

Similar to Comparison Example A, a crystalline, ethylenically unsaturated polyester was prepared from fumaric acid and 1,6-hexanediol in a molecular ratio of 1:1.8. This polyester had an acid number of 4.5 and a hydroxyl number of 300 (based on the $BF_3$ method), as well as a melt viscosity at 75° C. of 155 m.Pa.s. The calculated molecular weight factor per double bond was 292.4.

II Coherent phase polyhydroxyl compounds (b).

IIa A polyether polyol having a hydroxyl number of 400, prepared using sucrose as the initiator and oxyalkylating with 1,2-propylene oxide.

IIb A polyester polyol having a hydroxyl number of 344 and an acid number of 0.4 prepared by means of condensation polymerization of a dicarboxylic acid mixture containing succinic, glutaric, and adipic acids and ethylene glycol.

IIc A polyester polyol having a hydroxyl number of 354 and an acid number of 0.9 prepared by means of the condensation polymerization of a dicarboxylic acid mixture of succinic, glutaric, and adipic acids and diethylene glycol.

IId Ethyleneglycol phthalate having a hydroxyl number of 294 and an acid number of 1.56.

IIe Diethyleneglycol adipate having a hydroxyl number of 348 and an acid number of 2.8.

III Preparation of Crystallite Suspensions

EXAMPLE 3

A mixture composed of 41.74 parts polyether polyol IIa, 24.35 parts polyester polyol IIb, 20.78 parts of the crystalline polyester of Example 1, and 13.04 parts tris($\beta$-chloroethyl)phosphate were heated to 127° C. in a two-liter, four-neck flask while mixing until a completely clear solution was obtained. This solution was allowed to cool to 30° C. over five hours while mixing at an agitator speed of 400 rpm. A crystallite suspension having a hydroxyl number of 264 and an acid number of 1.1 possessing good flowability was obtained.

EXAMPLE 4

Analogous to Example 3, a crystallite suspension having a hydroxyl number of 257, an acid number of 1.2, and good flowability was obtained from the following starting components: 41.74 parts polyether polyol IIa, 12.175 parts polyester polyol IIb, 12.175 parts ethyleneglycol phthalate IId, 20.87 parts of the crystalline polyester of Example 1, and 13.04 parts tris($\beta$-chloroethyl)phosphate.

EXAMPLE 5

A mixture composed of 41.74 parts polyether polyol IIa, 20.87 parts of the crystalline polyester polyol of Example 1, and 13.04 parts tris($\beta$-chloroethyl)phosphate were heated to 127° C. in a two-liter four-neck flask while mixing until a completely clear solution was obtained. This solution was allowed to cool to 32° C. over five hours while mixing at an agitator speed of 400 rpm. At this temperature, 24.35 parts of polyester polyol IIb were added and agitation was continued for an additional three hours. A storage-stable crystallite suspension having a hydroxyl number of 262 and an acid number of 1.2 and having good flowability was obtained.

EXAMPLE 6

A mixture composed of 36.92 parts polyether polyol IIa, 30.0 parts of the crystalline polyester of Example 1, and 11.54 parts tris($\beta$-chloroethyl)phosphate were heated as in Example 5 and cooled to 30° C. over five hours. 21.54 parts of polyester polyol IIb were added at this temperature and the resulting mixture was agitated for an additional three hours. A storage-stable crystallite suspension having a hydroxyl number of 256, an acid number of 1.3 and exhibiting good flowability was obtained.

EXAMPLE 7

A mixture composed of 31.65 parts polyether polyol IIa, 40 parts of the crystalline polyester of Example 1, and 9.89 parts tris($\beta$-chloroethyl)phosphate were heated as in Example 5 to 127° C. and were cooled to 30° C. over five hours. At this temperature, 18.46 parts polyester polyol IIb were added and agitation was continued for an additional three hours. A storage-stable crystallite suspension having a hydroxyl number of 242, an acid number of 1.9 and good flowability was obtained.

EXAMPLE 8

One hundred parts of a crystallite suspension prepared in accordance with Example 7 were reacted at 25° C. with 91 parts of a mixture composed of 48.35 parts polyether polyol IIa, 24.21 parts polyester polyol IIb, and 15.1 parts tris(β-chloroethyl)phosphate. A storage-stable crystallite suspension having a hydroxyl number of 261, an acid number of 1.1, and exhibiting good flowability was obtained.

EXAMPLE 9

A mixture composed of 41.74 parts polyether polyol IIa, 20.87 parts of the crystalline polyester of Example 2, and 13.04 parts tris(β-chloroethyl)phosphate were heated as in Example 5 to 130° C. and cooled to 30° C. over five hours. At this temperature, 24.35 parts of polyester polyol IIb were added and agitation was continued for an additional three hours. A storage-stable crystallite suspension having a hydroxyl number of 262, acid number of 1.1 and exhibiting good flowability was obtained.

EXAMPLE 10

A mixture composed of 37.89 parts polyether polyol IIa, 40.0 parts of the crystalline polyester of Example 2, and 22.11 parts of polyester polyol IIb was heated in a two-liter, four-neck flask to 132° C. while stirring until a completely clear solution was obtained. This solution was allowed to cool to room temperature over eight hours while stirring at an agitator speed of 400 rpm. A crystallite suspension having a hydroxyl number of 297, an acid number of 2.0, and exhibiting good flowability was obtained.

EXAMPLE 11

A mixture composed of 31.58 parts polyether polyol IIa, 50.0 parts of the crystalline polyester of Example 2, and 18.42 parts of polyester polyol IIb were heated to 130° C. in a two-liter four-neck flask while stirring until a completely clear solution was obtained. This solution was allowed to cool to 30° C. over seven hours while stirring at an agitator speed of 400 rpm. A crystallite suspension having a hydroxyl number of 274 and an acid number of 2.0 and exhibiting flowability was obtained.

COMPARISON EXAMPLE C

The procedures described in Examples 3 and 5 were used. However, when the crystalline polyesters prepared in Comparison Examples A or B were used instead of the crystalline polyester of Example 1, rigid, non-flowing crystallite suspensions were obtained.

COMPARISON EXAMPLE D

A mixture composed of 41.74 parts polyether polyol IIa, 20.87 parts of the crystalline polyester from Comparison Example A, 24.35 parts polyester polyol IIc, and 13.04 parts tris(β-chloroethyl)phosphate were heated to 145° C. in a two-liter four-neck flask while mixing until a completely clear solution was obtained. This solution was allowed to cool to 30° C. over eight hours while mixing at an agitator speed of 400 rpm. A rigid non-flowing crystallite suspension was obtained.

COMPARISON EXAMPLE E

A mixture composed of 41.74 parts polyether polyol IIa, 20.78 parts of the crystalline polyester polyol of Comparison Example B, 24.35 parts polyester polyol IIc, and 13.04 parts tris(β-chloroethyl)phosphate were heated to 100° C. in a two-liter four-neck flask while mixing until a completely clear solution was obtained. This solution was allowed to cool to 30° C. over eight hours while mixing at an agitator speed of 400 rpm. A rigid non-flowing crystallite suspension was obtained.

IV Preparation of the modified crystallite

EXAMPLE 12

0.42 parts cyclohexylamine were incorporated in 100 parts of a crystallite suspension prepared as in Example 3 while stirring at 30° C. The reaction mixture heated up slightly. The reaction mixture was then stirred for an additional three hours at 35° C.

EXAMPLE 13

1.044 parts hexabromocyclododecane and 0.42 parts tert-butylperbenzoate were incorporated at 30° C. in 100 parts of a crystallite suspension prepared as in Example 3. The reaction mixture was then stirred for an additional three hours at 35° C.

EXAMPLE 14

0.42 parts tert-butylperoxide, 0.21 parts cobalt naphthenate, and 1.044 parts diallylphthalate were incorporated at 30° C. in 100 parts of a crystallite suspension prepared as in Example 3. The reaction mixture was then stirred for an additional three hours at 35° C.

V Preparation of polyurethane-group-containing polyisocyanurate foams

EXAMPLES 15-18

To prepare rigid, urethane-group-containing polyisocyanurate foams, component A was composed of 80 parts by weight of a crystallite suspension, 1.0 parts by weight of a foam stabilizer based on silicone DC 190 (Dow Corning Corp., Midland), 0.62 parts by weight N,N-dimethylaminocyclohexylamine, 5.13 parts by weight of a polyisocyanurate catalyst Curithane 52 B (Upjohn Co.), 20.0 parts by weight tris(β-chloroethyl)phosphate, and 42 parts by weight trichlorofluoromethane. The B component was composed of 202 parts by weight of a mixture of diphenylmethanediisocyanates and polyphenylene polymethylene polyisocyanates having an isocyanate content of 31 weight percent. The A and B components were mixed intensively for 20 seconds at room temperature. The expandable mixture was fed into an open mold and allowed to expand.

The crystallite suspensions which were used and their amounts, the foam expansion data, and the mechanical properties measured on the resulting foams are summarized in Table I.

COMPARISON EXAMPLE F

The procedures used in Examples 15-18 were followed, however a crystallite suspension prepared as described in European Published Application No. 62 204, Example 3 was used with 30.43 parts by weight tris(β-chloroethyl)phosphate.

TABLE I

Examples 15–18 and Comparison Example F

| Example Comparison Example | 15 | 16 | 17 | 18 | F |
|---|---|---|---|---|---|
| Crystallite Suspensions from | | | | | |
| Example 4 (weight parts) | 80 | — | — | — | — |
| Example 7 (weight parts) | — | 80 | — | — | — |
| Example 9 (weight parts) | — | — | 80 | — | — |
| Example 14 (weight parts) | — | — | — | 80 | — |
| EP unpublished application 62 204 (weight parts) Example 3 | | | | | 69.57 |
| Foam Expansion Data and Mechanical Properties: | | | | | |
| Cream Time (sec.) | 29 | 29 | 30 | 30 | 38 |
| Tack-Free Time (sec.) | 128 | 116 | 135 | 140 | 140 |
| Rise Time (sec.) | 260 | 240 | 240 | 235 | 260 |
| Brittleness Characteristics | good | good | good | good | average |
| Shrinkage | none | none | minimal | none | minimal |
| Cell Size | average | average | average | average | average |
| Flamability per EMPA Standard | V/3 | V/3 | V/3 | V/3 | V/2 |
| Smoke Gas Density (%) | 46 | 46 | 47 | 50 | 68 |
| Density (g/l) | 36.4 | 35.7 | 36.3 | 36 | 36.4 |
| Compressive Load per DIN 43 421 (N/mm$^2$) | 0.247 | 0.238 | 0.243 | 0.260 | 0.198 |
| Flexural Strength per DIN 53 452 (N/mm$^2$) | 0.369 | 0.356 | 0.369 | 0.370 | 0.328 |
| Dimensional Stability (%) | 0.1/−0.1/−0.2 | 0.1/−0.1/0.2 | 0.1/−0.1/0.2 | 0.1/−0.1/0.1 | 0/0/−0.2 |
| Dimensional Stability at elevated temperature (%) | −0.5/1.5/0.5 | −0.9/2.1/−0.4 | −0.5/1.0/0.6 | −0.5/1.0/−0.3 | −1.8/3.7/2.8 |
| Closed Cells (%) | 84.5 | 84.2 | 84 | 84 | 83.4 |

The embodiments of the invention in which an exclusive privilege or property is claimed are defined as follows:

1. A crystallite suspension comprising:

(a) as the dispersed phase, from 3 to 70 weight percent of a crystalline, ethylenically unsaturated polyester prepared through the condensation polymerization of fumaric acid and ethylene glycol in a molar ratio of from 1:1.2 to 1:2 wherein up to 18 mole percent of the fumaric acid may be replaced by other aliphatic, cycloaliphatic, and/or aromatic carboxylic acids and up to 20 mole percent of the ethylene glycol may be replaced by other mono-, di-, or trifunctional alcohols, said crystalline, ethylenically unsaturated polyester having a molecular weight factor per double bond of about 154 to 408; and (b) as the coherent phase, from 30 to 97 weight percent of a polyhydroxyl compound having a functionality of from 2 to about 8, a hydroxyl number of from 20 to 800, and a melting point of less than 30° C., wherein said weight percents are based on the total weight of components (a) and (b).

2. The crystallite suspension of claim 1 wherein said suspension additionally contains per 100 parts by weight of the crystallite suspension of components (a) and (b) from 0.1 to 7 parts by weight of an aliphatic, cycloaliphatic, or araliphatic primary or secondary amine, dialkylenetriamine, or alkanol amine wherein said amine is capable of undergoing a Michael reaction with the ethylenically unsaturated double bond of the polyester (a).

3. The crystallite suspension of claim 1 wherein said crystallite suspensions additionally contain aliphatic amines of formula

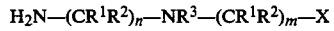

$$H_2N-(CR^1R^2)_n-NR^3-(CR^1R^2)_m-X$$

wherein:

$R^1$, $R^2$, $R^3$ are the same or different alkyl radicals having from 1 to 4 carbon atoms or hydrogen atoms, X is a $NH_2-$ or OH-group, n is a whole number from 2 to 12, and m is a whole number from 2 to 3.

4. The crystallite suspension of claim 1 wherein said suspension additionally contains per 100 parts of the crystallite suspension of components (a) and (b) from 1 to 50 parts of a chlorinated or brominated aliphatic, cycloaliphatic, or aromatic hydrocarbon.

5. The crystallite suspension of claim 4 wherein said chlorinated or brominated hydrocarbon is selected from the group consisting of chloroparaffins having a chlorine content of from 20 to 75 weight percent, hexabromocyclododecane and octabromobiphenyl.

6. The crystallite suspension of claim 1 wherein said suspension additionally contains per 100 parts by weight of the crystallite suspension of components (a) and (b) from 1 to 50 parts by weight of at least one ethylenically unsaturated monomer which may be copolymerized with the ethylenically unsaturated double bond of polyester (a).

7. The crystallite suspension of claim 1 wherein said suspension additionally contains per 100 parts by weight of the crystallite suspension of components (a) and (b) from 0.05 to 5 parts by weight of a free radical-forming substance.

8. The crystallite suspension of claim 1 wherein said suspension additionally contains chlorinated and/or brominated aliphatic, cycloaliphatic, or aromatic hydrocarbons, ethylenically unsaturated monomers and free radical-forming substances.

9. A process for the preparation of the crystallite suspension of claim 1 wherein the crystalline, unsaturated polyester (a) is dissolved in the coherent phase (b) at temperatures from 35° to 160° C. and the resulting solution is allowed to cool while being exposed to shear forces in order to form the crystallite suspension.

10. In a process for the preparation of polyurethane or polyurethane group-containing polyisocyanurate foams by the reaction of a polyol component with an isocyanate component, optionally in the presence of suitable catalysts, blowing agents, additives, and auxiliaries, the improvement comprising employing as the polyol component, the crystallite suspension of claim 1.

* * * * *

UNITED STATES PATENT AND TRADEMARK OFFICE
CERTIFICATE OF CORRECTION

PATENT NO. : 4,560,708

DATED : Dec. 24, 1985

INVENTOR(S) : Peter Horn, Anton Hesse, Walter Mann,
Wolfram Frank, Matthias Marx, Walter Heckmann It is certified that error appears in the above-identified patent and that said Letters Patent is hereby corrected as shown below:

<u>First page</u>, Bibliographic Data, add Code 30 -

Foreign Application Priority Data - Nov. 23, 1983

(DE) Fed. Rep. of Germany - 3342177

Signed and Sealed this

Thirteenth Day of May 1986

[SEAL]

Attest:

Attesting Officer

DONALD J. QUIGG

Commissioner of Patents and Trademarks